United States Patent
Ambroz et al.

(10) Patent No.: US 9,674,157 B2
(45) Date of Patent: Jun. 6, 2017

(54) SECURE NETWORK COMMUNICATION

(71) Applicant: JUMPTO MEDIA INC., Toronto (CA)

(72) Inventors: Alexander Ambroz, Haliburton (CA); Necj Palir, Celje (SI)

(73) Assignee: JUMPTO MEDIA INC., Toronto (CA)

( * ) Notice: Subject to any disclaimer, the term of this patent is extended or adjusted under 35 U.S.C. 154(b) by 88 days.

(21) Appl. No.: 14/775,068

(22) PCT Filed: Mar. 13, 2014

(86) PCT No.: PCT/CA2014/000209
§ 371 (c)(1),
(2) Date: Sep. 11, 2015

(87) PCT Pub. No.: WO2014/138883
PCT Pub. Date: Sep. 18, 2014

(65) Prior Publication Data
US 2016/0036785 A1    Feb. 4, 2016

Related U.S. Application Data

(60) Provisional application No. 61/780,106, filed on Mar. 13, 2013, provisional application No. 61/804,509, filed on Mar. 22, 2013.

(51) Int. Cl.
*H04L 29/06* (2006.01)

(52) U.S. Cl.
CPC ........ *H04L 63/0428* (2013.01); *H04L 63/062* (2013.01); *H04L 63/068* (2013.01); *H04L 63/0272* (2013.01)

(58) Field of Classification Search
CPC . H04L 63/0428; H04L 63/068; H04L 63/062; H04L 9/0863
See application file for complete search history.

(56) References Cited

U.S. PATENT DOCUMENTS

2006/0136750 A1* 6/2006 Jakubowski ............ G06F 21/14
713/193
2008/0172730 A1  7/2008 Sandhu et al.
(Continued)

OTHER PUBLICATIONS

PCT Application No. PCT/CA20141000209—International Preliminary Report on Patentability, dated Sep. 15, 2015.
(Continued)

*Primary Examiner* — David Pearson
(74) *Attorney, Agent, or Firm* — Perry + Currier Inc.

(57) ABSTRACT

A client device configured to intercept an outgoing packet. The outgoing packet includes a destination network address. The client device is further configured to use an encryption key to encrypt the outgoing packet to generate an encrypted packet, scatter the encryption key into the encrypted packet according to pattern logic defined by a unique identifier of a routing server, and send the encrypted packet containing the scattered encryption key to the routing server. The routing server is configured to receive the encrypted packet containing the scattered encryption key, extract the encryption key from the encrypted packet using the pattern logic defined by the unique identifier, use the encryption key to decrypt the encrypted packet to obtain the outgoing packet including the destination network address, and send the outgoing packet to the destination network address.

28 Claims, 7 Drawing Sheets

(56) References Cited

U.S. PATENT DOCUMENTS

2009/0316905 A1* 12/2009 Qureshi ................. G06F 21/10
380/277
2011/0296179 A1* 12/2011 Templin ................ H04L 9/0869
713/168

OTHER PUBLICATIONS

Extended European Search Report dated Nov. 7, 2016 for European Patent Applicaton No. 14764426.4.

* cited by examiner

SECURE NETWORK COMMUNICATION

CROSS-REFERENCE TO RELATED APPLICATIONS

This application claims priority to U.S. provisional applications 61/780,106, filed Mar. 13, 2013, and 61/804,509, filed Mar. 22, 2013, the contents of which are incorporated herein by reference.

FIELD

The present invention relates to secure connections and communications between devices and computers on the Internet and in virtual private networks.

BACKGROUND

A variety of methods have been proposed and implemented to provide security and anonymity for device and computer communication over the Internet and in virtual private networks. Conventional communication solutions, including secure virtual private networks, connect a remote device or computer to the target device or computer, while data security is typically tackled using some form of data encryption. These devices and computers in virtual private networks can securely communicate with the exchange of public and private encryption keys or by separately routing (a) the packets of protected data and (b) their encryption keys, from the point of origin—through disparate network paths encompassing multiple devices or computers—to the point of destination. This kind of security is primarily used for corporate virtual private networks that require a broad communication policy thus binding devices and computers to specific networks is preferred.

These typical virtual private network solutions contain many potential security concerns where there is a need to (a) securely control communication for specific applications and their protocols from devices and computers through foreign networks, (b) ensure that these applications and their protocols can only communicate within the desired foreign networks, and (c) ensure that encryption keys cannot be tracked or traced and that the data cannot be interpreted.

For instance, Larson (U.S. Pat. No. 8,051,181) teaches a technique to establishing a secure communication link between computers of virtual private networks in which one or more data values that vary according to a pseudo-random sequence are inserted into each data packet in order to provide multiple paths to reach the destination. Although Larson provides security enhancements for typical virtual private networks, there remains a need for secure and efficient Internet communication between applications installed on devices.

SUMMARY

According to one aspect of the present invention, a system for communicating over a network includes a client device configured to intercept an outgoing packet, the outgoing packet including a destination network address. The client device is further configured to use an encryption key to encrypt the outgoing packet to generate an encrypted packet, scatter the encryption key into the encrypted packet according to pattern logic defined by a unique identifier of a routing server, and send the encrypted packet containing the scattered encryption key to the routing server. The system further includes a routing server configured to receive the encrypted packet containing the scattered encryption key, extract the encryption key from the encrypted packet using the pattern logic defined by the unique identifier, use the encryption key to decrypt the encrypted packet to obtain the outgoing packet including the destination network address, and send the outgoing packet to the destination network address.

According to another aspect of the present invention, a client device includes a network interface controller configured to intercept outgoing packets, each outgoing packet including a destination network address. The client device further includes a local proxy server configured to receive the intercepted outgoing packets, control an encryption engine to generate new packets from the outgoing packets, and send the new packets to at least one routing server. The client device further includes the encryption engine configured to use encryption keys to encrypt the intercepted outgoing packets to generate encrypted packets, and scatter the encryption keys into the encrypted packets according to pattern logic defined by at least one unique identifier of the at least one routing server to obtain the new packets.

According to another aspect of the present invention, a routing server includes a network interface controller configured to receive encrypted packets from at least one client device via a network, a protocol agnostic proxy server configured to control an encryption engine to decrypt the received encrypted packets and send packets to at least one destination address via the network, and the encryption engine configured to extract scattered encryption keys from the received encrypted packets using pattern logic defined by a unique identifier of the routing server, and use the encryption keys to decrypt the encrypted packets to obtain the packets to send to the at least one destination address.

According to another aspect of the present invention, a method performed by a client device connected to a network includes intercepting an outgoing packet, the outgoing packet including a destination network address. The method further includes using an encryption key to encrypt the outgoing packet including the destination network address to obtain an encrypted packet, scattering the encryption key into the encrypted packet according to pattern logic defined by a unique identifier of a routing server to obtain a new packet, and sending the new packet to the routing server.

According to another aspect of the present invention, a method performed by a routing server operating in a network includes receiving an encrypted packet via the network from a client device, extracting an encryption key from the received encrypted packet using pattern logic defined by a unique identifier of the routing server, using the encryption key to decrypt the received encrypted packet to obtain an outgoing packet of the client device, the outgoing packet including a destination network address, and sending the outgoing packet to the destination network address.

According to another aspect of the present invention, a method of encrypting a packet includes randomly generating an encryption key from at least user entropy, performing a cryptographic hash on data content of an outgoing packet, using the encryption key to encrypt the outgoing packet to obtain an encrypted packet, performing a cryptographic hash on the encrypted packet, and compressing the encrypted packet.

The method can further include scattering the encryption key into the encrypted packet according to pattern logic defined by a unique identifier of a routing server to obtain a new packet.

The method can be performed independently for each outgoing packet of a plurality of outgoing packets and can use different encryption keys, different cryptographic hashing, and different unique identifiers.

BRIEF DESCRIPTION OF THE DRAWINGS

Embodiments of the present invention will now be described, by way of example only, with reference to the accompanying drawings, in which.

DETAILED DESCRIPTION

The present invention relates to the field of secure connections and communications between devices and computers on the Internet and in virtual private networks. More particularly, the invention concerns securely connecting and communicating with applications installed on devices and computers to form virtual cloud networks. More particularly, the invention includes application-specific protocol filtering and routing for secure remote communication from within a country of any virtual cloud network.

The present invention can provide secure network communication between applications installed on device without the need to (a) bind devices or computers to substantially the same network, (b) constantly exchange encryption keys, and (c) perform complex packet routing through disparate paths and through multiple servers to achieve safer communication.

The present invention can also provide increased flexibility to securely and efficiently connect specific applications with specific protocols on dissimilar devices or computers connected on many foreign networks for private, secure and anonymous Internet communication.

The present invention can provide a way of securely and efficiently connecting devices and computers in foreign networks across the Internet, to form secure virtual cloud networks, by employing new security and network routing techniques on the connected devices.

The present invention can provide a secure mechanism for device and computer communication over the Internet that uses (a) a local software firewall that intercepts all outbound traffic on devices and computers, (b) a multi-layer security protection for data packets, including encryption and compression, without exposure of encryption keys, (c) a multi-layer secure proxy server, and (d) a specialized communication routing server. The combined use of these processes in one unified software solution, installed on all connected devices and computers, allows for the creation of secure virtual cloud networks. Once devices and computers are authenticated to a virtual cloud network, all applications installed on connected devices and computers can securely connect, share and communicate with other applications installed on remote devices and computers in disparate networks.

With utilization of aspects of the present invention, cloud-based applications, including browsing and downloading apps, secure file sharing apps, secure e-mail apps, and secure text, voice and video apps, can be securely accessible from any device or computer authenticated to the virtual cloud network; connected devices include computers, tablets, smart phones and smart TVs. Aspects of the invention can provide users secure and anonymous access to their applications and the associated data from any device or computer connected anywhere on the Internet.

Figure 1:
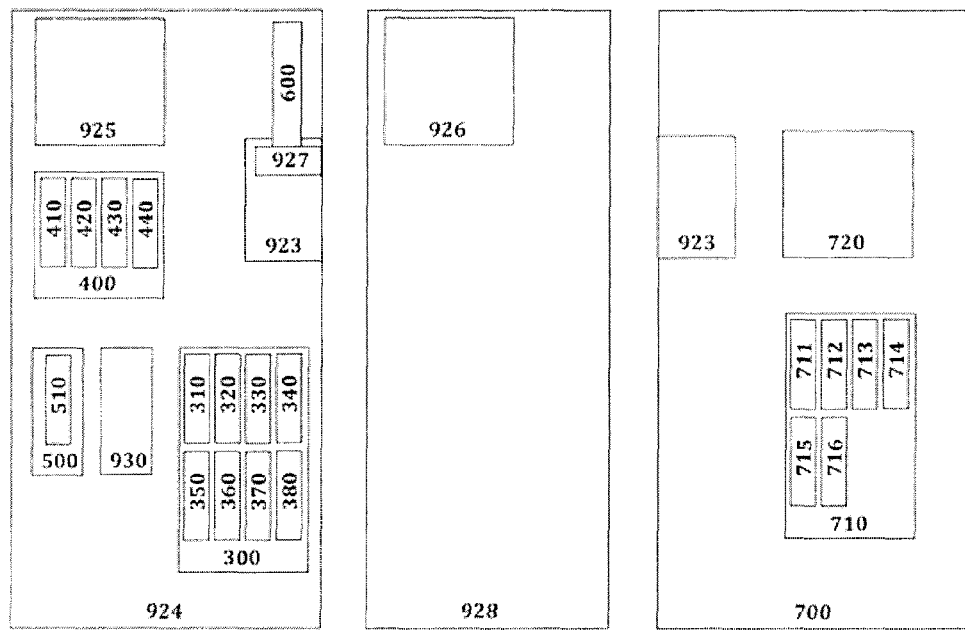
FIG. 1 is a block diagram of software components.
Figure 2:
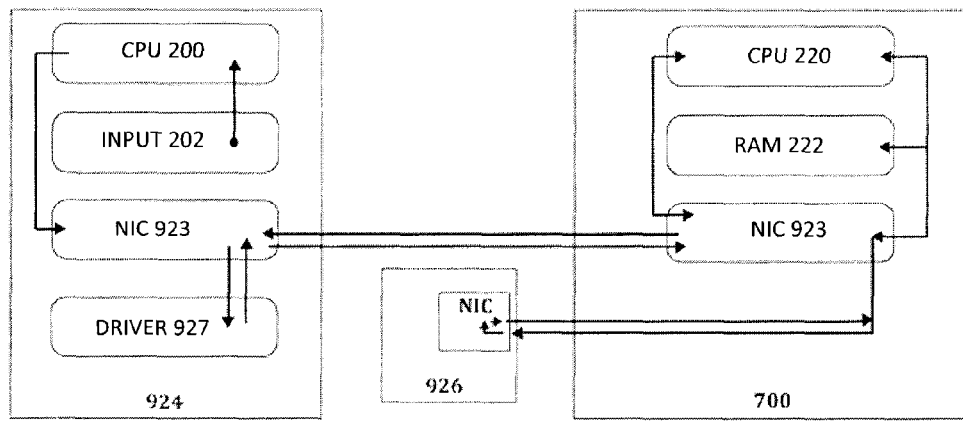
FIG. 2 is a block diagram of hardware components.

Referring now to the invention in more detail, in FIG. 1 and FIG. 2 there are shown plurality of software and hardware components, respectively, which can be used to implement embodiments of the invention:

200—Processor
202—Input device
220—Processor
222—Memory
300—Encryption Engine
310—Generate Random Encryption Key
320—Encrypt Data
330—Decrypt Data
340—Generate Cryptographic Hash
350—Build Encryption Key
360—Scatter Encryption Key
370—Compress Data
380—Decompress Data
400—Local Proxy Server
410—Construct and Send Network Packet
420—Deconstruct Network Packet
430—Node Connector
440—Node Switcher
500—Secure Cloud Communicator
510—List of Available Nodes
600—Local Firewall with Packet Filtering Capabilities
700—Server Computer
710—Encryption Engine
711—Encrypt Data
712—Decrypt Data
713—Build Encryption Key
714—Scatter Encryption Key 715—Compress Data
716—Decompress Data
720—Protocol Agnostic Proxy Server
921—Encryption Key
922—Unique Server Node Identification
923—Network Interface Controller
924—Device
925—Network Packet
926—Packet Destination
927—Driver
928—Public Internet
929—Encrypted Packet
930—Node IP Variable
931—Unencrypted Packet With reference to FIG. 2, the client device 924 can include a processor (e.g., CPU) 200, an input device 202, a network interface controller 923, and an intercepting driver 923 resident in memory (not shown). The routing server 700 can include a processor (e.g., CPU) 220, random-access memory (RAM) 222, and a network interface controller 923.

Referring to FIG. 1 and FIG. 2, embodiments of the invention include a technique for securely connecting devices and computers on the Internet to form secure virtual cloud networks. Initially, a firewall with packet filtering capabilities 600, containing the intercepting driver, monitors and intercepts all data packets on the network interface controller 923; it permits users to intercept all network traffic on devices and computers. Data packets are protected with multi-layer security, including encryption and compression. The protected packets contain the hidden and scattered encryption key sequence. They are securely routed through multi-layer proxy servers 400, which include remote server computers 700 connected to the Internet. Server computers 700 receive and read the protected packets, while the encryption key is not exposed.

In further detail, still referring to FIG. 1 and FIG. 2, the intercepting driver intercepts the outgoing network packets and forwards them to a local proxy server 400 that processes and encrypts the packets. The intercepting driver holds the connection open while it creates a new packet with the encrypted content of the halted packet and sends it out through the local proxy server 400 to the server computer 700. Server computer 700 decrypts the received content, gathers the data from the original request and returns it to the client device or computer that requested it in the encrypted form. The packet with the open connection remaining open is injected with the response received from the proxy server. Each individual packet is modified, encrypted and compressed. The modified packets contain the hidden and scattered encryption key sequence.

Figure 3:
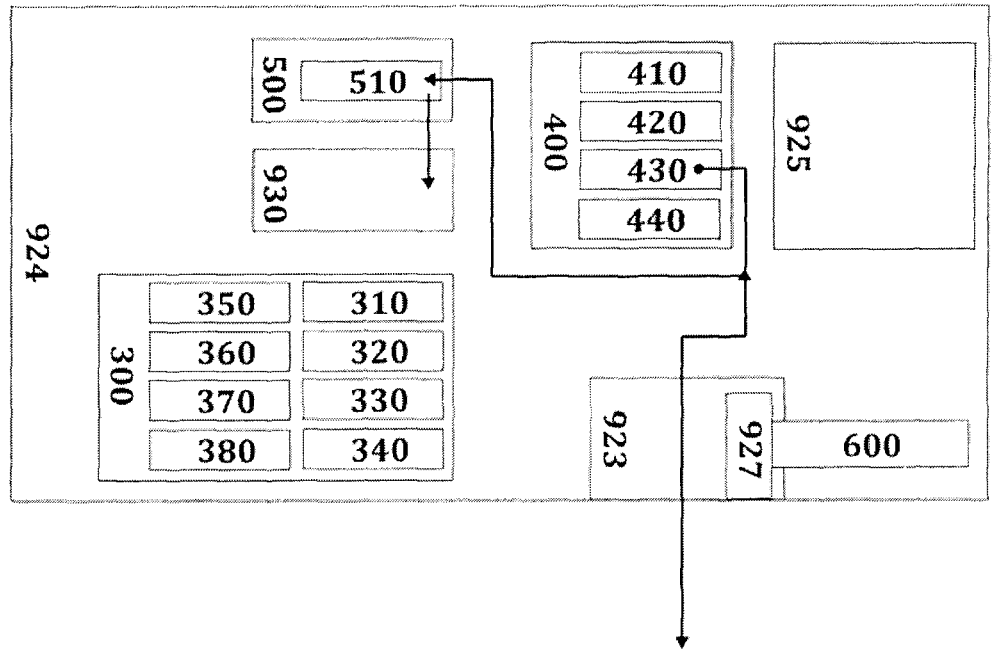
FIG. 3 is a process diagram of connecting to the server computer.

Referring now to FIG. 3, the process of connecting to a node 430 is triggered when the local proxy server process receives the command "connect node" along with the required parameter "unique node identification". In the first step, the process of connecting to a node 430 queries the list of available nodes 510. The process of fetching and returning the list of all available server nodes 510 on the secure network is triggered by calling the secure cloud communicator process with the "list nodes" command. Node connector 430 communicates with the network server and retrieves the list of all available nodes on the network along with the "unique node identification" numbers and the array of inbound IP addresses available for connection. The second step returns the constructed list as the result of the process. The local secure cloud communicator 500 is a software component or script, which is installed and running on the user's device. It periodically or manually, on demand, connects to a network server and sets or gets data depending on the command issued. The secure cloud communicator 500 is used to authenticate local user on a device and fetch the list of available nodes. The process of fetching and returning the list of all available server nodes 510 on the secure network is triggered by calling the secure cloud communicator process 500 with the "list nodes" command. Node connector 430 communicates with the network server and retrieves the list of all available nodes on the network along with the "unique node identification" numbers and the array of inbound IP addresses available for connection. The second step returns the constructed list as the result of the process. The list of available nodes process 510 returns an array of available IP addresses to connect to and stores it to a temporary variable "A". A random IP address is chosen from the array in variable "A" and set as the global node IP variable 930. The global node IP variable 930 is a globally set variable in the software which contains the IP address of the node server that is being used for connection routing. The connection to the node is established.

Figure 4:
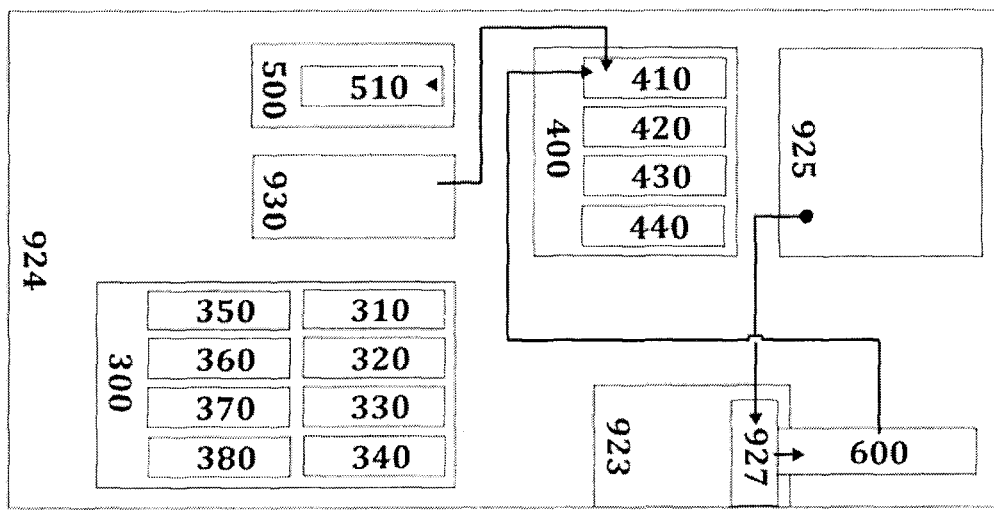
FIG. 4 is a process diagram of intercepting the outbound network packets and forwarding them to a local proxy server for further processing.

Referring now to FIG. 4, the network packet 925 is dispatched by the local network and gets intercepted by the local firewall with packet filtering capabilities 600. The local firewall with packet filtering capabilities 600 requires the installation of a special packet interception driver 927 on the network interface controller 923 in order to intercept the packets and forward them to the local proxy server 400 for further processing. A network interface controller 923 is a computer hardware component that connects a computer to a computer network. The interception driver 927 is a computer program that operates and controls the 927 network interface controller and is customized to communicate with the local proxy server 400 on the application layer. The local proxy server 400 is a software component or script, which is installed and running on the user's device. It listens for commands from processes described herein, drivers discussed herein, as well as other software using inter-process communication. It is configured to route traffic of intercepted outgoing network packets, send and receive network packets, switch the connecting nodes, detect the best location of the node to route data, and randomize the nodes and/or outgoing IP addresses of connecting nodes. The proxy server connects and forwards traffic to the server node IP address defined in the global node IP variable described in 930. The global node IP variable 930 is a globally set variable in the software, which contains the IP address of the node server that is being used for connection routing.

Figure 5:
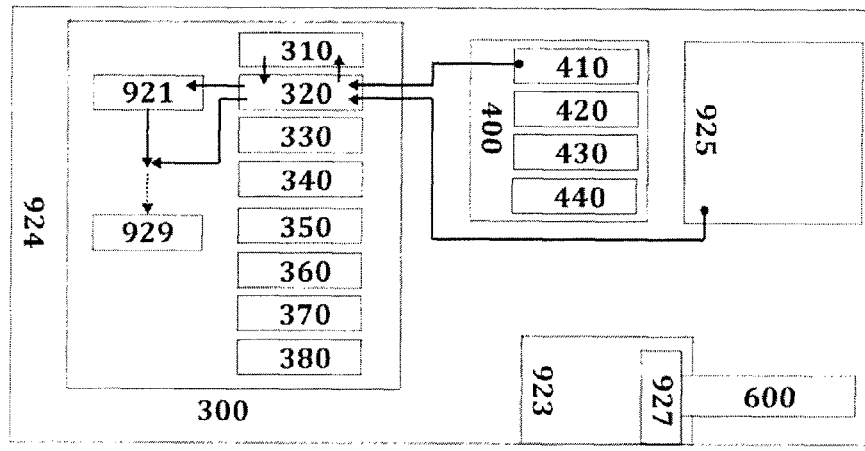
FIG. 5 is a process diagram of generating the random encrypting key and encrypting the network data packet.

Referring now to the embodiment of FIG. 5, the process of constructing a network packet 410 is triggered when the local proxy server receives the command "construct" along with the required parameter "packet A" and "destination IP address". The result of constructing a network packet 410 is the creation of a new network packet, "packet B". The "packet B" headers are set to route to the "destination IP address". The "packet A" is kept alive without leaving the device until a response is received and injected in it. The entire packet, which is passed in the parameter "packet A", is encrypted using the encryption engine and the process described in 320 and is stored in the temporary variable "A". The process of encrypting data 320 is triggered when the encryption engine 300 process receives the action command "encrypt data" along with the required parameter "data" and the "unique target identification". The encryption engine 300 is a software component or script, which is installed and is running on users' devices. It listens for commands from the processes described herein, drivers discussed herein, as well as other software, using inter-process communication. It is configured to encrypt the content of outgoing packets, decrypt the data of incoming packets, generate the random encryption key, scatter the encryption key and rebuild it for dynamic encryption as well as generate cryptographic hashes. The data parameter is stored in the temporary variable "A" and emptied after successful completion of data encryption. The unique target destination is stored in the temporary variable "B" and emptied after successful completion of data encryption.

In the first step, construct and send network packet process 410 internally communicates with the process 310 and stores the generated encryption key into variable "C". The process of creating a random encryption key 310 is triggered if the encryption engine process receives the action command "generate key". The encryption key is generated by using Unix Epoch time, a 32-digit random number and mouse entropy. The values are stored and combined into a temporary variable "Z". Variable "Z" gets cryptographically hashed by using the internal process 340. The process of generating a cryptographic hash 340 is triggered when the encryption engine process 300 receives the command "hash" along with the required parameter "value". The value parameter is stored in a temporary variable "Z". The value of variable "Z" is emptied and deleted from memory after the successful completion of this process. The encryption engine 300 uses one of the irreversible cryptographic hashing methods defined by the global system (SHA-2, SHA-3) to hash the value of variable "Z" and return it as the result of this process. The values of variables are emptied and deleted from memory. The cryptographically hashed value gets returned as the final result.

In the second step, construct and send network packet process 410 encrypts the variable "A" with the encryption key from variable "C" using the system defined encryption algorithm (AES, RSA, Serpent, Two-fish). The encrypted data is returned and stored into variable "D".

In the third step, construct and send network packet process 410 internally communicates with the process 360 and scatters the encryption key within the variable "D" on a predefined pattern, which depends on the unique destination identification. The value of variable "D" is updated.

In the fourth step, construct and send network packet process 410 internally communicates with the process 370 which compresses the scattered value of variable "D" to a smaller value. The value of variable "D" is updated. The compressed variable "D" is returned as the result of the encryption process. The variables are emptied and deleted from system memory. This completes the data encryption process. The encrypted variable "A" is used as the data and/or content parameter of the newly constructed "packet B". The result of this process is the dispatch of the creation of the variables required in the next process of scattering the encryption key 360.

Figure 6:
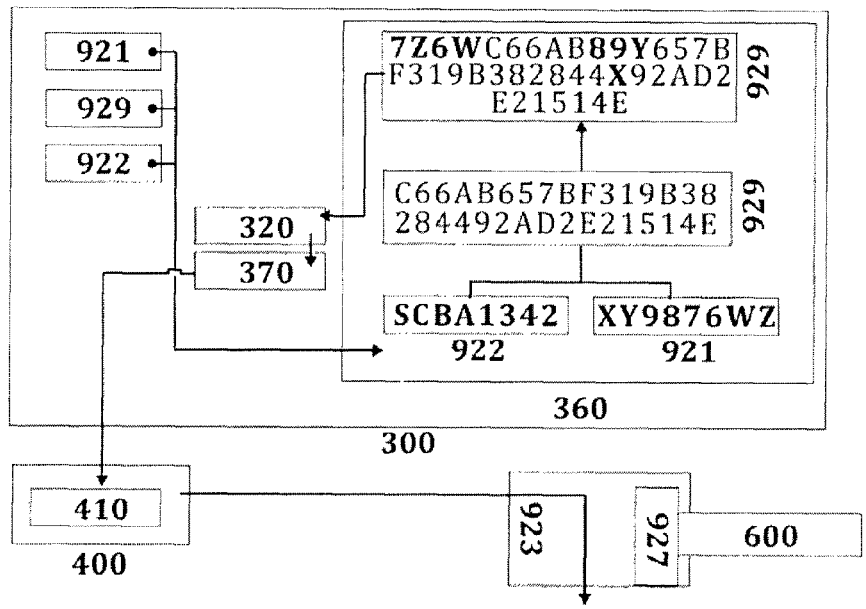
FIG. 6 is a process diagram of scattering the encryption key within the encrypted content using the first unique node identification as the pattern for the scattering logic.

Referring now to FIG. 6, the process of scattering the encryption 360 key is triggered when the encryption engine process receives the command "scatter key" along with the required parameters "encrypted data" 929, "encryption key" 921 and "unique target identification" 922. The encryption key 921 is used to encrypt and decrypt the binary value of the network packet. The encryption key is generated in the 310 process. The unique server node identification 922 is a series of characters, which uniquely identify a server node. The unique server node identification 922 is used as the logic pattern for scattering and building the encryption key within the encryption engine. Scatter encryption key process 360 divides the encryption key and scatters it within encrypted data using the logic pattern from the "unique target identification" parameter. In some examples, the unique server node identification (unique identifier) is only known to the server that it identifies, and therefore only that server can extract the encryption key from the packet. The method, which defines the inter-operation of the unique target identification related to the scattering of the encryption key, is hardcoded into the 300 encryption engine. The encryption engine 300 is a software component or script, which is installed and running on the user's device. It listens for commands from the processes described herein, drivers discussed herein, as well as other software using inter process communication. It is configured to encrypt the content of outgoing packets, decrypt the data of incoming packets, generate the random encryption key, scatter the encryption key and rebuild it for dynamic encryption as well as generate cryptographic hashes. The hardcoded method must be substantially the same within the local encryption engine 300 and within the encryption engine located on the server computer 700, in order for "encrypt data" and "decrypt data" processes to work and correctly compile and decompile information. In order to create an example, we will use the value of "SCBA1342" as the unique target identification 922, "XY9876WZ" as the generated encryption key 921 and "C66AB657BF319B38284 492AD2E21514E" as the encrypted content 929. We will use a pattern logic, which scatters the encryption key within the encrypted content, by using numbers and characters from the unique target identification as position marks for each corresponding character in the encryption key 921. The numbers from 0-9 have the value range of 0-9. The letters in the English alphabet have the value range of 10-35. By knowing the pattern of scattering the encryption key, we translate the unique target identification value "SCBA1342" to position values. The letter "S" is the first character in the unique target identification, and if converted, has the position value of 28, which means that the first character from the encryption key 921 is injected before the 28th character in the encrypted data 929. The exact position translation for the scattering pattern "SCBA1342" is "28-12-11-10-1-3-4-2". After completing the scattering of the encryption key 921, we end up with the result of "7Z6WC66AB8 9Y657BF319B382844X92AD2E21514E", which replaces variable 929 as the new encrypted packet. The length of the encryption key lengthens the encrypted data value. The lengthened encrypted data containing the scattered encryption key is returned as the result of process 360. Note that this pattern example is merely an illustrative example used only to explain the concept of encryption key scattering. Implementation examples vary in the method of implementation, length of encryption keys, length of unique target identification and complexity of the pattern structure. The scattered encryption gets returned to the encrypt data process 320, which compresses the data using the compression process 370, for increased network performance, and returns it to the 410 process in the local proxy server 400. The process of compressing data 370 is triggered when the encryption engine process receives the command "compress data" along with the required parameter "encrypted data". Scatter encryption key process 360 compresses the parameter "encrypted data" using the system defined compression algorithm (for example, LZ4, ZIP, RAR, TAR, or TAR.GZ). The compressed data is returned as the result of this process. The packet in process 410 is flagged with ignore bits that informs the local firewall with packet filtering capabilities 600 to ignore the filtering process during traffic processing. The result of this process is the dispatch of packets from the system to the server computer 700, identified with the unique target identification. The server computer 700 is a hardware server running on CENTOS, for example, with the encryption engine and with the protocol agnostic proxy server 720 installed on it.

Figure 7:
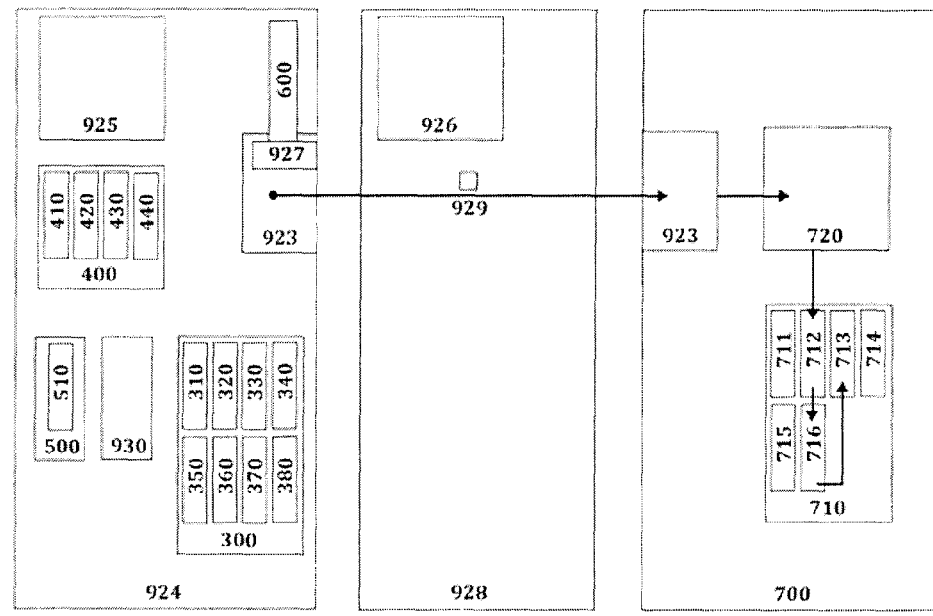
FIG. 7 is a process diagram of sending the packet to the server computer and processing it with the protocol agnostic proxy server which decompresses it and forwards it for encryption key rebuilding.

Referring now to FIG. 7, the encrypted packet 929 is sent to the server computer 700 via the public internet 928. The packet is received and processed by the protocol agnostic proxy server 720. The protocol agnostic proxy server 720 runs on the server computer and accepts inbound network connections on the specific port, in the range of selected IP addresses. It is capable of processing network protocols regardless of their type (for example, UDP, TCP/IP). The packet is forwarded to the data decryption process 712 within the encryption engine 710. The encryption engine 710 is a software component or script, which is installed and running on the server computer. It listens for commands from the processes described herein, drivers discussed herein, as well as other software using inter process communication. It is configured to encrypt the content of outgoing packets, decrypt the data of incoming packets, generate the random encryption key, scatter the encryption key and rebuild it for dynamic encryption as well as generate cryptographic hashes. The process of decrypting data 712 is triggered when the encryption engine 710 process receives the action command "decrypt data" along with the required parameter "encrypted data" and "unique target identification". The encrypted data parameter is stored in the temporary variable "A" and emptied after successful completion of data decryption. The unique target destination is stored in the temporary variable "B" and emptied after successful completion of data encryption.

In the first step, the encrypted packet process 929 internally communicates with the process 716, which decompresses the received data from variable "B". The process of decompressing data 716 is triggered when the encryption engine 710 process receives the command "decompress data", along with the required parameter "compressed data". The encrypted packet process 929 decompresses the parameter "compressed data" using the system defined compression algorithm (for example, LZ4, ZIP, RAR, TAR, or TAR.GZ). The decompressed data is returned as the result of this process. The value of variable "B" is updated with the new decompressed value. In the second step, the encrypted packet process 929 internally communicates with the process 713, which builds the scattered encryption key within the variable "B" on a predefined pattern, which is dependent on the unique destination identification.

Figure 8:
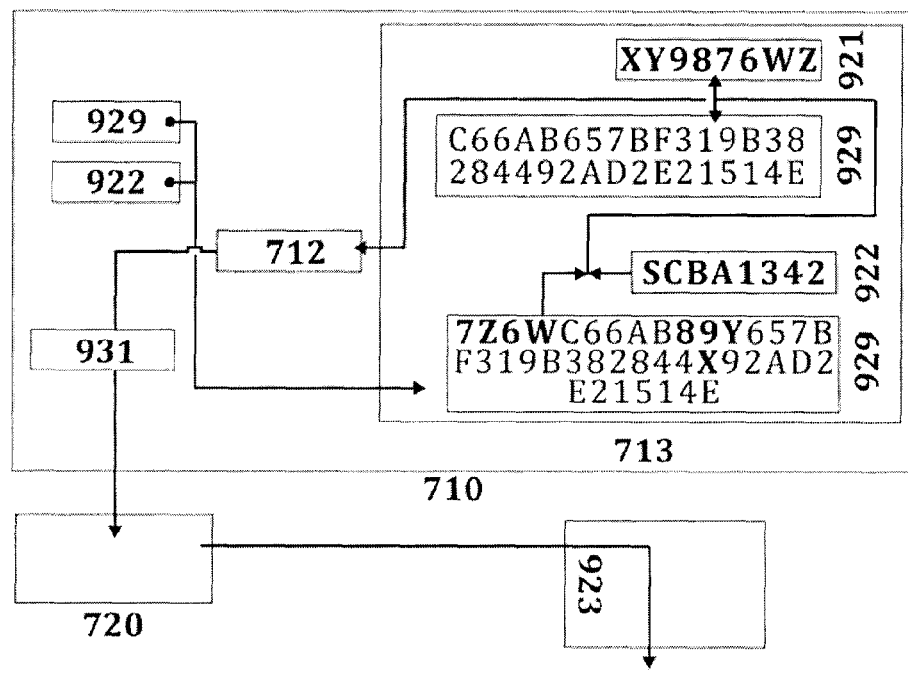
FIG. 8 is a process diagram of rebuilding the encryption content and the encryption key by using the unique node identification as the pattern for the rebuilding logic.

Referring now to FIG. 8, the process of building the encryption key 713 is triggered when the encryption engine process receives the command "build key", along with the required parameters "encrypted data" 929 and "unique target identification" 922. Build the encryption key process 713 extracts the encryption key and the encrypted content from the encrypted data parameter using the logic pattern from the "unique target identification" parameter. The method, which defines the inter-operation of the unique target identification related to the scattering of the encryption key, is hardcoded into the 710 encryption engine. The encryption engine 710 is a software component or script, which is installed and running on a server computer. It listens for commands from the processes described herein, drivers discussed herein, as well as other software using inter-process communication. It is configured to encrypt the content of outgoing packets, decrypt the data of incoming packets, generate the random encryption key, scatter the encryption key and rebuild it for dynamic encryption as well as generate cryptographic hashes. The hardcoded method must be substantially the same within the local encryption engine 300 and within the encryption engine located on the server computer 700, in order for "encrypt data" and "decrypt data" processes to work and correctly compile and decompile information. In order to create an example we use the value of "SCBA1342" as the unique target identification 922, and "7Z6WC66AB89Y657BF319B382844X92AD2E21514E" as the encrypted content 929, which contains a secret scattered encryption key. We use a pattern logic that rebuilds and divides the scattered encryption key and encrypted content from the encrypted content by using numbers and characters from the unique target identification, as position marks for each corresponding character for the encryption key 921. The numbers from 0-9 have the value range of 0-9. The letters in the English alphabet have the value range of 10-35. By knowing the pattern of scattering the encryption key, we can translate the unique target identification value "SCBA1342" to position values. The letter "S" is the first character in the unique target identification, and when converted, it has the position value of 28, which means that the first character to form the encryption key 921 is the $28^{th}$ character in the encrypted data 929. The exact position translation for the scattering pattern "SCBA1342" is "28-12-11-10-1-3-4-2". After completing the scattering of our encryption key within the encrypted content, we get two separated variables as the result of this process. We get the encryption key 921 value "XY9876WZ" and the encrypted content 929 value "C66AB657BF319B38 284492AD2E21514E", as the new data to be decrypted. The extracted encryption key and the extracted content are returned as the result of this process. They are forwarded back to data decryption process 712 for data decryption. The process of decrypting data 712 is triggered when the encryption engine 710 process receives the action command "decrypt data", along with the required parameter "encrypted data" and "encryption key". The encryption key is stored into a temporary variable "C" and a session permanent variable that is used during encryption during the creation of the reply network package. The encrypted content is stored into a temporary variable "D". Build the encryption key process 713 decrypts the variable "D" with the built encryption key from variable "C" using the system defined encryption algorithm (AES, RSA, Serpent, Twofish). The decrypted data is returned as the result of this process. The variables are emptied and deleted from system memory. The decryption of data is complete. The unencrypted packet 931 is forwarded to the protocol agnostic proxy server 720 for further processing. The process of the protocol agnostic proxy server 720 runs on the server computer and accepts inbound network connections on the specific port in the range of selected IP addresses. The proxy server processes and decrypts the received encrypted requests and makes a new request to the originally intended destination. The destination is read from the header of the unencrypted network packet 931 and sent out via the network controller interface 923.

Figure 9:
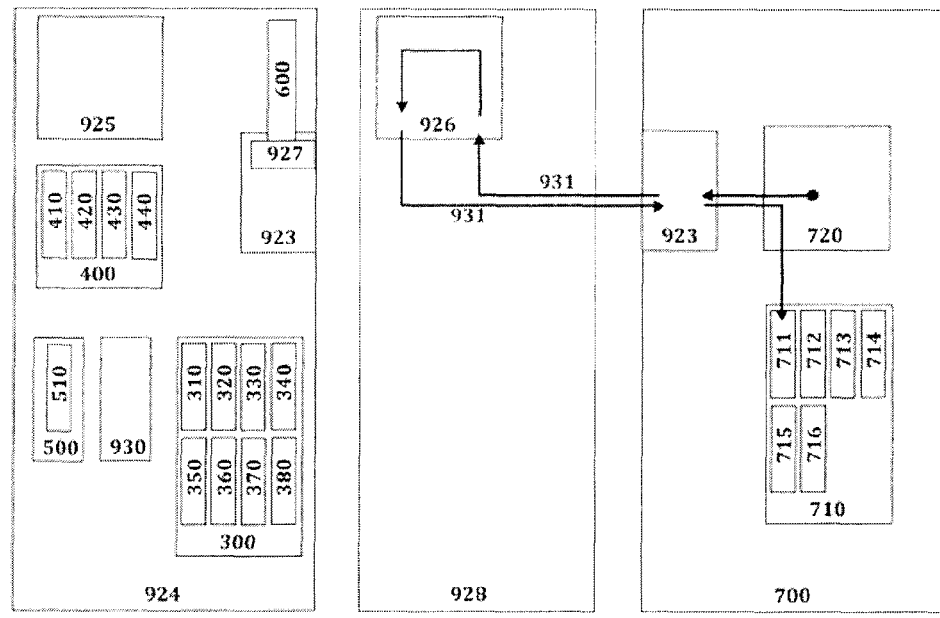
FIG. 9 is a process diagram of sending the decrypted network packet to its target destination and forwarding its reply to the encryption engine for further processing.

Referring now to FIG. 9, the unencrypted network packet 931 is sent by the server computer 700 to the packet destination server 926. The 926 packet destination server is a computer server, which was addressed in the originally intercepted network packet in FIG. 4. The server computer 700 is a hardware server running on CENTOS, for example, with the encryption engine and with the protocol agnostic proxy server 720 installed on it. The request from the unencrypted network packet 931 gets processed by the packet destination server 926, which returns an unencrypted packet back to the protocol agnostic proxy server 720, as the processed reply to the sent request. The process of the protocol agnostic proxy server 720 runs on the server computer and accepts inbound network connections on the specific port in the range of selected IP addresses. Once the packet is received by the protocol agnostic proxy server 720, it gets forwarded to the data encryption 711 process within the encryption engine 710 and prepares and encrypts the packet for a structured reply to the connected device, which triggered the original request.

Figure 10:
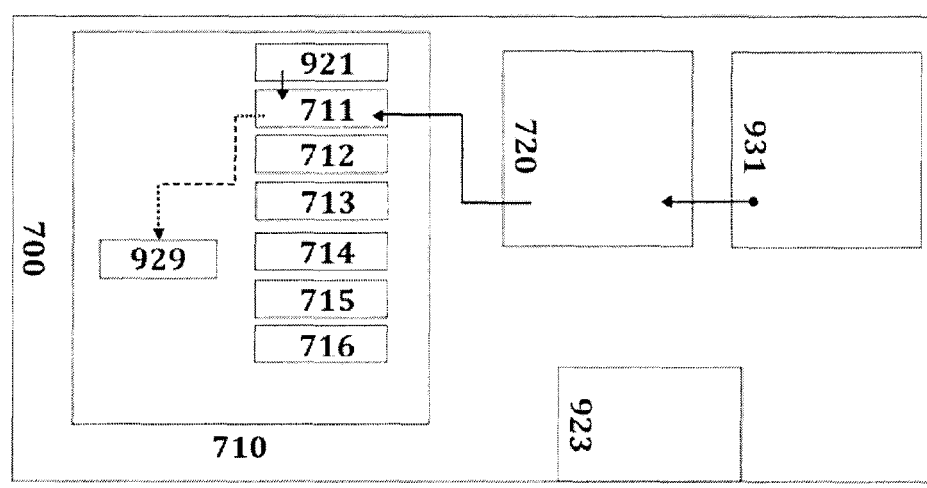
FIG. 10 is a process diagram of encrypting the network packet on its return path by using the predefined encryption key.

Referring now to FIG. 10, the unencrypted packet 931 gets forwarded to the encryption engine 710 for data encryption within the data encryption process 711. The encryption engine 710 is a software component or script, which is installed and running on server computer. It listens for commands from the processes described herein, drivers discussed herein, as well as other software using inter-process communication. It is configured to encrypt the content of outgoing packets, decrypt the data of incoming packets, generate the random encryption key, scatter the encryption key and rebuild it for dynamic encryption and to generate cryptographic hashes. The process of encrypting data 711 is triggered when the encryption engine 710 process receives the action command "encrypt data" along with the required parameter "data". The data parameter is stored in the temporary variable "A" and emptied after successful completion of data encryption. The encryption key 921, used to encrypt the data, is pulled from the session permanent variable that was populated and set as described in FIG. 8. Unencrypted packet process 931 encrypts the variable "A" with the encryption key 921, using the system defined encryption algorithm (AES, RSA, Serpent, Twofish). The encrypted data is returned and stored into variable "D". The variables are emptied and deleted from system memory. This completes the data encryption process. An encrypted network packet 929 is returned as the result of this process.

Figure 11:
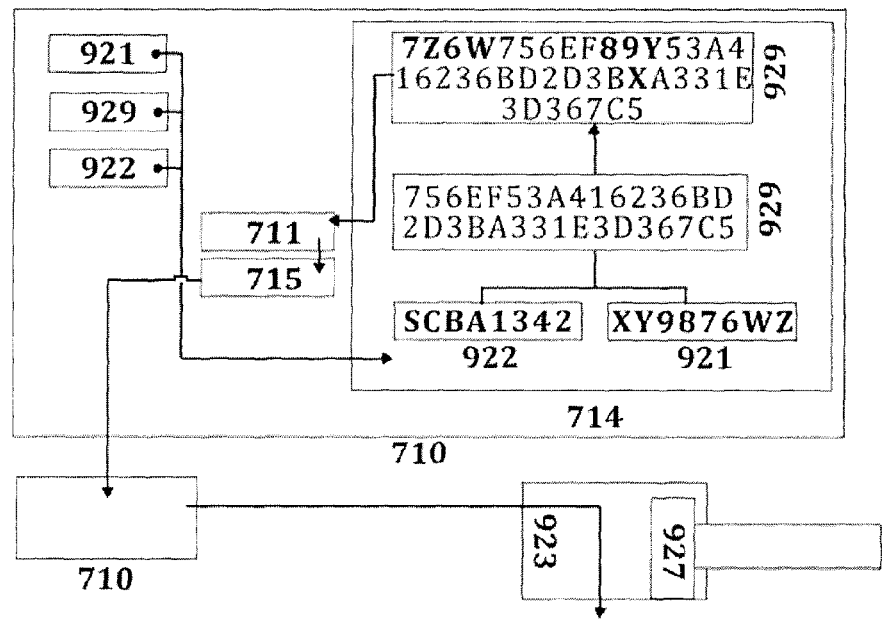
FIG. 11 is a process diagram of scattering the encryption key within the encrypted content using the second unique node identification as the pattern for the scattering logic.

Referring now to FIG. 11, the process of scattering the encryption key 714 is triggered when the encryption engine process receives the command "scatter key", along with the required parameters "encrypted data" 929, the "encryption key" 921 and the "unique target identification" 922. The encryption key 921 is used to encrypt and decrypt the binary value of the network packet. The unique server node identification 922 is a series of characters, which uniquely identify a server node. The unique server node identification 922 is used as the logic pattern for scattering and building the encryption key within the encryption engine. Scatter encryption key process 714 divides the encryption key and scatters it within encrypted data using the logic pattern from the "unique target identification" parameter. In some examples, the unique server node identification (unique identifier) is only known to the server that it identifies, and therefore only that server can extract the encryption key from the packet. The method, which defines the inter-operation of the unique target identification related to the scattering of the encryption key, is hardcoded into the 710 encryption engine. The encryption engine 710 is a software component or script, which is installed and is running on server computer. It listens for commands from the processes described herein, drivers discussed herein, as well as other software using inter-process communication. It is configured to encrypt the content of outgoing packets, decrypt the data of incoming packets, generate the random encryption key, scatter the encryption key and rebuild it for dynamic encryption as well as generate cryptographic hashes. The hard-coded method must be substantially the same within the local encryption engine 300 and within the encryption engine located on the server computer 700, in order for "encrypt data" and "decrypt data" processes to work and correctly compile and decompile information. In order to create an example we use the value of "SCBA1342" as the unique target identification 922, "XY9876WZ" as the previously stored encryption key 921 and "756EF53A416236BD2D3BA331E3D367C5" as the encrypted content 929. We use a pattern logic, which scatters the encryption key within the encrypted content, by using numbers and characters from the unique target identification as position marks for each corresponding character in the encryption key 921. The numbers from 0-9 have the value range of 0-9. The letters in the English alphabet have the value range of 10-35. By knowing the pattern of scattering the encryption key we can translate the unique target identification value "SCBA1342" to position values. The letter "S" is the first character in the unique target identification, and when converted, it has the position value of 28, which means that the first character from the encryption key 921 will is injected before the 28$^{th}$ character in the encrypted data 929. The exact position translation for the scattering pattern "SCBA1342" is "28-12-11-10-1-3-4-2". After completing the scattering of our encryption key within the encrypted content, we get the result of "7Z6W756EF89Y5 3A416236BD2D3BXA331E3D367C5", which replaces variable 929 as the new encrypted packet. The length of the encryption key lengthens the encrypted data value. The lengthened encrypted data containing the scattered encryption key is returned as the result of process 714. Note that this pattern example is merely an illustrative example used only to explain the concept of encryption key scattering. Implementation examples vary in the method of implementation, length of encryption keys, length of unique target identification and complexity of the pattern structure. The scattered encryption gets returned to the encrypt data process 711, which compresses the data using the compression process 715 for increased network performance and returns it to the protocol agnostic proxy server 710 process for further processing. The process of compressing data 715 is triggered when the encryption engine process receives the command "compress data" along with the required parameter "encrypted data". Scatter encryption key process 714 compresses the parameter "encrypted data" using the system defined compression algorithm (for example, LZ4, ZIP, RAR, TAR, TAR.GZ). The compressed data is returned as the result of this process. The result of this process is the dispatch of the packet from the server computer 700 back to the requesting client device via the network interface controller 923. The server computer 700 is a hardware server running on CENTOS, for example, with the encryption engine and the protocol agnostic proxy server 720 installed on it.

Figure 12:
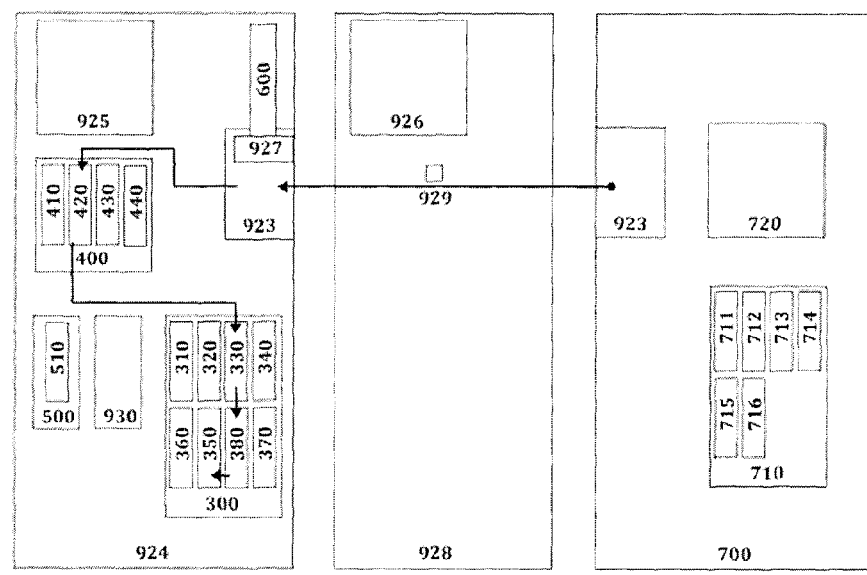
FIG. 12 is a process diagram of sending the encrypted network packet back to the client destination and forwarding to the local proxy server which decompresses it and forwards it for encryption key rebuilding.

Referring now to FIG. 12, the local proxy server 400 receives the encrypted packet 929 from the server computer 700 and triggers the process of deconstructing a network packet 420. The process of deconstructing a network packet 420 is triggered on the response from sending the packet in process 410. The received packets' data and content are stored in a variable "A" and decrypted by the encryption engine with the decrypt data process 330. The decrypted content of the received packet is the response, which gets injected to the "packet A" in process 410 as the response. The local proxy server 400 is a software component or script, which is installed and running on the user's device. It listens for commands from the processes described herein, drivers discussed herein, as well as other software using inter-process communication. It is configured to route traffic of intercepted outgoing network packets, send and receive network packets, switch the connecting nodes, detect the best location of the node to route data, and to randomize the nodes and/or outgoing IP addresses of connecting nodes. The proxy server connects and forwards traffic to the server node IP address defined in the global node IP variable, as described in 930. The global node IP variable 930 is a globally set variable in the software, which contains the IP address of the node server that is being used for connection routing. The server computer 700 is a hardware server running on CENTOS, for example, with the encryption engine and protocol agnostic proxy server 720 installed on it. The process of decrypting data 330 is triggered when the encryption engine process 300 receives the action command "decrypt data", along with the required parameter "encrypted data" and the "unique target identification". The encrypted data parameter is stored in the temporary variable "A" and emptied after successful completion of data decryption. The unique target destination is stored in the temporary variable "B" and emptied after successful completion of data encryption.

In the first step, local proxy server 400 internally communicates with the process 380 which decompresses the received data from variable "B". The value of variable "B" is updated with the new decompressed value. The process of decompressing data 380 is triggered if the encryption engine process receives the command "decompress data" along with the required parameter "compressed data". Local proxy server process 400 decompresses the parameter "compressed data" using the system defined compression algorithm (for example, LZ4, ZIP, RAR, TAR, TAR.GZ). The decompressed data is returned as the result of this process.

In the second step, local proxy server 400 internally communicates with the process 350, which builds the scattered encryption key within the variable "B" on a predefined pattern, which is dependent on the unique destination identification.

Figure 13:
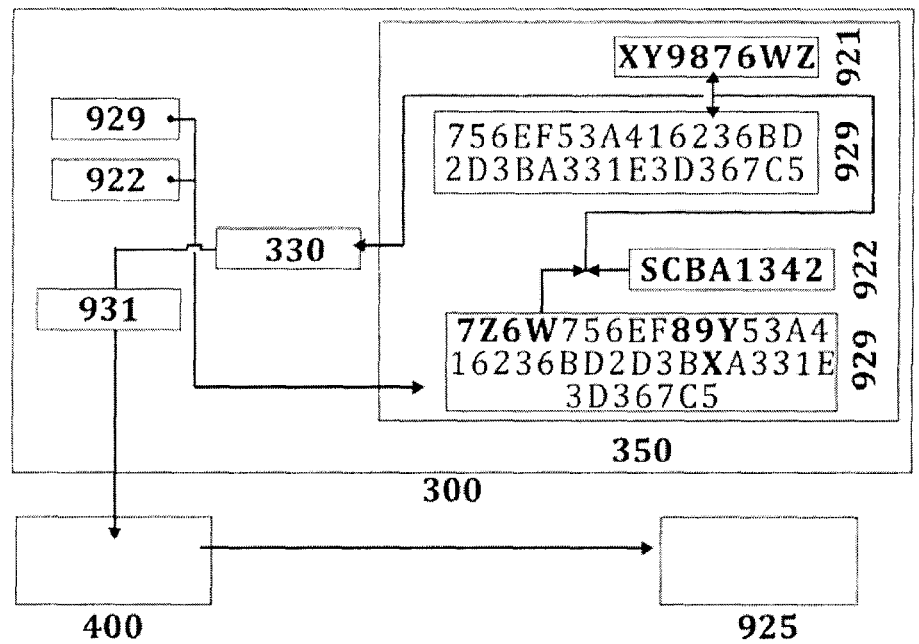
FIG. 13 is a process diagram of rebuilding the encryption content and the encryption key by using the unique node identification as the pattern for the rebuilding logic. The packet is decrypted and its content is returned as a reply to the original network request via the local proxy server.

Referring now to FIG. 13, the process of building the encryption key 350 and rebuilding the encrypted content is triggered when the encryption engine process 300 receives the command "build key", along with the required parameters "encrypted data" and the "unique target identification". The encryption engine 300 is a software component or script, which is installed and running on users' device. It listens for commands from the processes described herein, drivers discussed herein, as well as other software using inter-process communication. It is configured to encrypt the content of outgoing packets, decrypt the data of incoming packets, generate the random encryption key, scatter the encryption key and rebuild it for dynamic encryption as well as generate cryptographic hashes. Build the encryption key process 350 extracts the encryption key and the encrypted content from the encrypted data parameter using the logic pattern from the "unique target identification" parameter. The method, which defines the inter-operation of the unique target identification related to the scattering of the encryption key, is hardcoded into the encryption engine 300. The hardcoded method must be substantially the same within the local encryption engine 300 and within the encryption engine located on the server computer 700, in order for "encrypt data" and "decrypt data" processes to work and correctly compile and decompile information. In order to create an example we use the value of "SCBA1342" as the unique target identification 922, and "7Z6W756EF89Y53A416236BD2D3BXA331E3D367C5" as the encrypted content 929, which contains a secret scattered encryption key. We use a pattern logic that rebuilds and divides the scattered encryption key and encrypted content from the encrypted content, by using numbers and characters, from the unique target identification as position marks for each corresponding character for the encryption key 921. The numbers from 0-9 have the value range of 0-9. The letters in the English alphabet have the value range of 10-35. By knowing the pattern of scattering the encryption key we can translate the unique target identification value "SCBA1342" to position values. The letter "S" is the first character in the unique target identification and if converted has the position value of 28, which means that the first character to form the encryption key 921 is the $28^{th}$ character in the encrypted data 929. The exact position translation for the scattering pattern "SCBA1342" is "28-12-11-10-1-3-4-2". After completing the scattering of our encryption key within the encrypted content we get two separated variables as the result of this process. We get the encryption key 921 value "XY9876WZ" and the encrypted content 929 value "756EF53A416236BD2D3BA331E3D367C5", as the new data to be decrypted by the decryption engine 330. The process 350 returns the two variables: the dynamic encryption key 921 and the encrypted content 929. The encryption key is stored into a temporary variable "C" while the encrypted content is stored into a temporary variable "D". The third step uses the decryption process 300 to decrypt the variable "D" with the built encryption key from variable "C" using the system defined encryption algorithm (for example, AES, RSA, Serpent, Two-fish). The decrypted data is returned as the result of this process. The variables are emptied and deleted from system memory. This completes data decryption. The decrypted packet 931 is returned and injected to the network packet 925 as the network packet containing the reply to its original network request.

Figure 14:
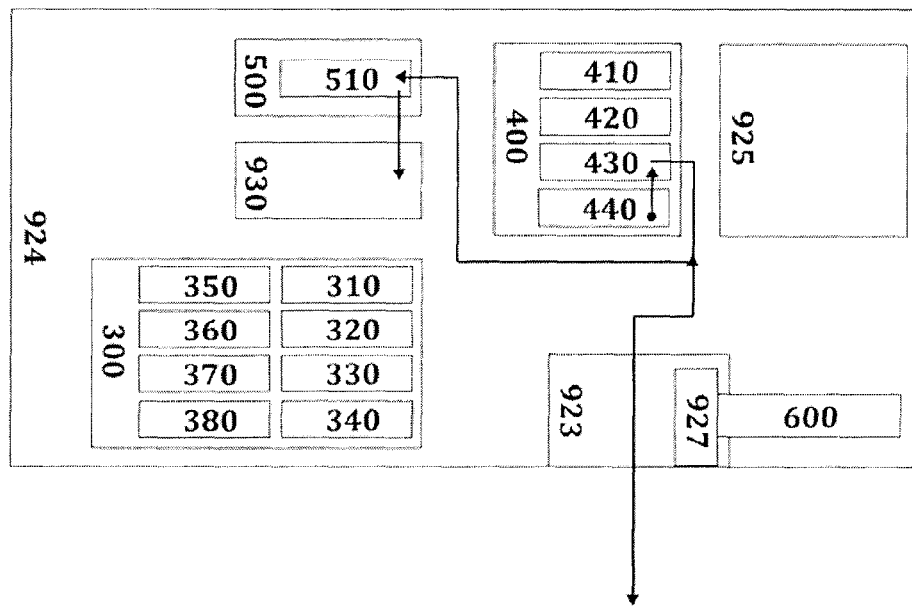
FIG. 14 is a process diagram of switching the location of the server computer by changing the global variable.

Referring now to FIG. 14, the node switcher process 440 address without breaking the node connection and temporarily disabling and compromising network security is triggered when the local proxy server 400 process receives the command "switch node", along with the required parameter "unique node identification". The local proxy server 400 is a software component or script, which is installed and running on the user's device. It listens for commands from the processes described herein, drivers discussed herein, as well as other software using inter-process communication. It is configured to route traffic of intercepted outgoing network packets, send and receive network packets, switch the connecting nodes, detect the best location of the node to route data, and to randomize the nodes and outgoing IP addresses of connecting nodes. The proxy server connects and forwards traffic to the server node IP address defined in the global node IP variable described in 930. The global node IP variable 930 is a globally set variable in the software, which contains the IP address of the node server that is being used for connection routing. Node switcher process 440 queries the list of available nodes 510. The list of available nodes process 510 returns an array of available IP addresses to connect to and stores it to a temporary variable "A". A random IP address is chosen from the array in variable "A" and set as the global node IP variable 510. The connection to the node is established automatically on the next request triggered by an outgoing network packet.

As apparent from the above, several client devices can securely communicate with each other through the routing server, where each client's packets are encrypted differently such that only the intermediating routing server can decrypt them. In such examples, outgoing packets from each client device identify the other client device by destination address.

The term "server" as used herein is not limiting and denotes any electronic device capable of performing the functions described herein, such as servers, computers, mobile devices, smartphones, and the like.

While the foregoing provides certain non-limiting example embodiments, it should be understood that combinations, subsets, and variations of the foregoing are contemplated. The monopoly sought is defined by the claims.

What is claimed is:

1. A system for communicating over a network, the system comprising:
   a client device configured to intercept an outgoing packet, the outgoing packet including a destination network address, the client device further configured to use an encryption key to encrypt the outgoing packet to generate an encrypted packet, scatter the encryption key into the encrypted packet according to pattern logic defined by a unique identifier of a routing server, and send the encrypted packet containing the scattered encryption key to the routing server; and
   a routing server configured to receive the encrypted packet containing the scattered encryption key, extract the encryption key from the encrypted packet using the pattern logic defined by the unique identifier, use the encryption key to decrypt the encrypted packet to obtain the outgoing packet including the destination network address, and send the outgoing packet to the destination network address.

2. The system of claim 1, wherein the client device is further configured to compress the encrypted packet and contained scattered encryption key before sending such to the routing server, and wherein the routing server is configured to decompress the encrypted packet and contained scattered encryption key.

3. The system of claim 1, wherein:
   the routing server is further configured to receive from the destination network address a response packet responsive to the outgoing packet, use the encryption key to encrypt the response packet, scatter the encryption key into the encrypted response packet according to the pattern logic, and send the encrypted response packet containing the scattered encryption key to the client device; and
   the client device is further configured to receive and decrypt the encrypted response packet.

4. The system of claim 3, wherein the destination network address is the address of another of said client device.

5. The system of claim 1, wherein the client device is further configured to randomly select one a plurality of routing servers for a particular outgoing packet.

6. A client device comprising:
   a network interface controller configured to intercept outgoing packets, each outgoing packet including a destination network address;
   a local proxy server configured to receive the intercepted outgoing packets, control an encryption engine to generate new packets from the outgoing packets, and send the new packets to at least one routing server; and
   the encryption engine configured to use encryption keys to encrypt the intercepted outgoing packets to generate encrypted packets, and scatter the encryption keys into the encrypted packets according to pattern logic defined by at least one unique identifier of the at least one routing server to obtain the new packets.

7. The device of claim 6 further configured to:
   authenticate a user at the client device;
   when the user is authenticated, fetch from a server a plurality of nodes including network addresses and associated unique identifiers; and
   select one of the plurality of nodes as the at least one routing server.

8. The device of claim 7, wherein the local proxy server is configured to switch between the plurality of nodes to select the at least one routing server.

9. The device of claim 7, wherein the one of the plurality of nodes is selected randomly.

10. The device of claim 6, wherein the encryption engine is further configured to generate encryption keys using at least user entropy.

11. The device of claim 6, wherein the local proxy server is further configured to keep an outgoing packet alive until receiving a response packet from a respective destination network address.

12. A routing server comprising:
   a network interface controller configured to receive encrypted packets from at least one client device via a network;
   a protocol agnostic proxy server configured to control an encryption engine to decrypt the received encrypted packets and send packets to at least one destination address via the network; and
   the encryption engine configured to extract scattered encryption keys from the received encrypted packets using pattern logic defined by a unique identifier of the routing server, and use the encryption keys to decrypt the encrypted packets to obtain the packets to send to the at least one destination address.

13. The routing server of claim 12, further comprising at least one session variable for storing at least one of the extracted encryption keys.

14. A method performed by a client device connected to a network, the method comprising:
   intercepting an outgoing packet, the outgoing packet including a destination network address;
   using an encryption key to encrypt the outgoing packet including the destination network address to obtain an encrypted packet;
   scattering the encryption key into the encrypted packet according to pattern logic defined by a unique identifier of a routing server to obtain a new packet; and
   sending the new packet to the routing server.

15. The method of claim 14, further comprising keeping the outgoing packet alive until receiving a response packet from the destination network address.

16. The method of claim 14, further comprising:
   authenticating a user at the client device;
   when the user is authenticated, fetching from a server a plurality of nodes including network addresses and associated unique identifiers; and
   selecting one of the plurality of nodes as the at least one routing server.

17. The method of claim 14, further comprising switching between the plurality of nodes to select the at least one routing server.

18. The method of claim 14, further comprising:
   before using the encryption key to encrypt the outgoing packet:
      randomly generating the encryption key from at least user entropy;
      performing a cryptographic hash on data content of the outgoing packet; and after using the encryption key to encrypt the outgoing packet:
  performing a cryptographic hash on the encrypted packet; and
  compressing the encrypted packet.

19. The method of claim 18, further comprising after scattering the encryption key into the encrypted packet, compressing the new packet.

20. The method of claim 19, wherein the method is performed independently for each outgoing packet of a plurality of outgoing packets.

21. The method of claim 19, wherein the method is performed independently for each outgoing packet of a plurality of outgoing packets using different encryption keys, different cryptographic hashing, and different unique identifiers.

22. A method performed by a routing server operating in a network, the method comprising:
  receiving an encrypted packet via the network from a client device;
  extracting an encryption key from the received encrypted packet using pattern logic defined by a unique identifier of the routing server;
  using the encryption key to decrypt the received encrypted packet to obtain an outgoing packet of the client device, the outgoing packet including a destination network address; and
  sending the outgoing packet to the destination network address.

23. The method of claim 22, further comprising:
  receiving a response packet via the network from the destination network address;
  using the encryption key to encrypt the response packet received from the destination network address to obtain an encrypted response packet;
  scattering the encryption key into the encrypted response packet according to the pattern logic; and
  sending the encrypted response packet containing the scattered encryption key to the client device.

24. The method of claim 23, further comprising storing the encryption key in a session variable.

25. The method of claim 23, further comprising decompressing the encrypted packet before extracting the encryption key.

26. A method of encrypting a packet, the method comprising:
  randomly generating an encryption key from at least user entropy;
  performing a cryptographic hash on data content of an outgoing packet;
  using the encryption key to encrypt the outgoing packet to obtain an encrypted packet;
  performing a cryptographic hash on the encrypted packet;
  compressing the encrypted packet; and
  further comprising scattering the encryption key into the encrypted packet according to pattern logic defined by a unique identifier of a routing server to obtain a new packet.

27. The method of claim 26, wherein the method is performed independently for each outgoing packet of a plurality of outgoing packets.

28. The method of claim 26, wherein the method is performed independently for each outgoing packet of a plurality of outgoing packets using different encryption keys, different cryptographic hashing, and different unique identifiers.

* * * * *